J. P. MORINE.
DETACHABLE HANDLE FOR TEACUPS, SAUCEPANS, AND THE LIKE.
APPLICATION FILED APR. 15, 1920.
1,341,756.
Patented June 1, 1920.
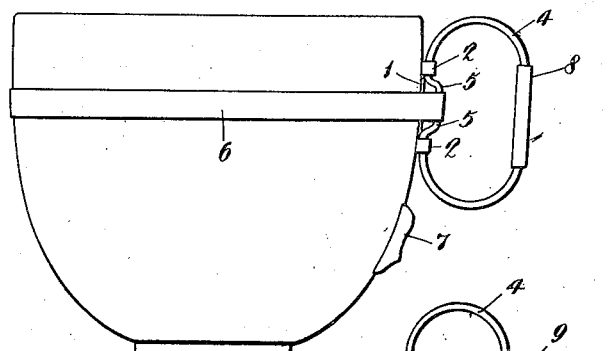
FIG. 1.
FIG. 7.
FIG. 2.
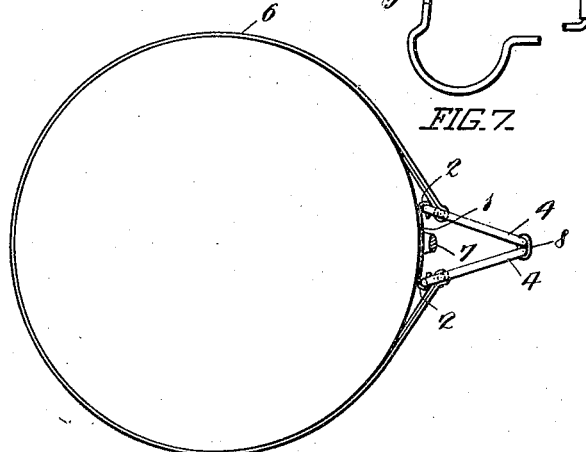
FIG. 4.
FIG. 3.
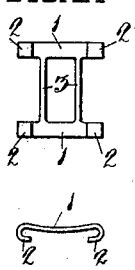
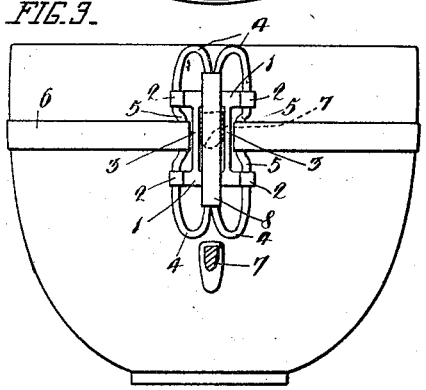
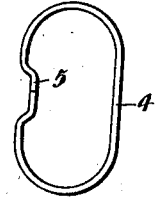
FIG. 6.
FIG. 5.
Inventor
J. P. Morine
By H. R. Kerslake
Attorney

UNITED STATES PATENT OFFICE.

JOHN PIERRE MORINE, OF TRENTHAM, NEW ZEALAND.

DETACHABLE HANDLE FOR TEACUPS, SAUCEPANS, AND THE LIKE.

1,341,756. Specification of Letters Patent. Patented June 1, 1920.

Application filed April 15, 1920. Serial No. 374,158.

*To all whom it may concern:*

Be it known that I, JOHN PIERRE MORINE, citizen of the Dominion of New Zealand, residing at Trentham, in the Provincial District of Wellington, New Zealand, have invented certain new and useful Improvements in Detachable Handles for Teacups, Saucepans, and the like, of which the following is a specification.

This invention provides a handle which is capable of being readily secured on and removed from, teacups, jugs, saucepans and similar articles and utensils, which either have no handles or from which the ordinary handles have been broken.

According to the invention the handle consists of two approximately oval shaped grips large enough to receive the fingers of the hand of the user and with their inner sides bent inward, except the portions near the ends.

A thin metal band is passed around the cup or the like, and the ends bent inward over the inwardly bent portions of the grips, to between the cup or the like and the band.

The inner sides of the wire grips are then engaged near their ends, in the hooked ends of horizontal connecting bars so that on the outer sides of the grips being pressed together and secured by a clip the metal band is tightened around the cup or the like and the grips are securely retained thereon to provide a convenient and suitable handle.

For a sauce pan or utensil which requires a long handle, the oval shaped grips are provided with extensions which when pressed and secured together form a handle of the length required.

Referring to the accompanying drawing in conjunction with which the invention will be more particularly described:—

Figure 1 is a side view of a cup with the handle thereon according to this invention and Fig. 2 is a plan view of same.

Fig. 3 is an elevation, at right angles to Fig. 1.

Fig. 4 is an elevation and

Fig. 5 a plan view of the connecting bars.

Fig. 6 shows one of the wire grips as used on a cup or the like and

Fig. 7 shows same in the form preferred for a saucepan or similar utensil.

The attachment comprises a pair of horizontal connecting bars 1 with hooked ends 2 and joined by vertical strips 3 a short distance apart, a pair of approximately oval shaped wire grips 4 having portions 5 of their inner sides bent inward, and a thin metal band 6.

In securing the attachment to an article such as a cup from which the handle has been broken, the ends of the band 6 are bent inward around the inwardly bent portions 5 of the grips 4, so that when the band is placed on the cup or the like said ends are located between the band 6 and the cup or other article.

The horizontal connecting bars 1 are placed on the cup preferably one above and one below the portions 7 of the ordinary handle, remaining thereon, with the strips 3 one at each side of said portions 7.

The inner sides of the grips 4 are then engaged near their ends, in the hooked ends 2 of the connecting bars 1, and on pressing the outer sides of the grips 4 together, the inturned ends of the band 6 are pressed hard by the band against the cup, and the band 6 itself is strained tightly around the latter, owing to the leverage obtained by the bending inward of the portions 5 of the grips.

The outer sides of the grips 4 are secured together by means of a clip 8 consisting of a strip of metal bent to encircle same.

The grips 4 can be formed with extensions 9 as shown in Fig. 7, said extensions when pressed and secured together providing a handle of the length required.

The handle is removed for cleaning and other purposes by simply unfastening the clip 8 which holds the outer sides of the two wire grips or parts of the handle together.

What I do claim and desire to secure by Letters Patent of the United States is:—

1. An attachment for the purpose specified comprising connecting bars with hooked ends; grips with portions of their inner sides bent inward engaged in the hooked ends of the connecting bars; a band with its ends secured to the inwardly bent portions of the grips, passing around the article and means for securing the outer sides of the grips together.

2. An attachment for the purpose specified comprising horizontal connecting bars joined together and having hooked ends;

wire grips with portions of their inner sides bent inward, engaged near the ends of their inner sides in said hooked ends; a metal band passing around the article and having its ends bent inward over the inwardly bent portions of the grips, and a clip for securing the outer sides of the grips together.

In testimony whereof I affix my signature in the presence of two witnesses.

JOHN PIERRE MORINE.

Witnesses:
ERNEST WILFRED BOYCE CAREY,
THYRA MARGARET BALDWIN.